US008573405B2

(12) United States Patent
Finnie

(10) Patent No.: US 8,573,405 B2

(45) Date of Patent: Nov. 5, 2013

(54) MEDIA DEPOSITORY

(75) Inventor: Alan Finnie, Dundee (GB)

(73) Assignee: NCR Corporation, Duluth, GA (US)

( * ) Notice: Subject to any disclaimer, the term of this patent is extended or adjusted under 35 U.S.C. 154(b) by 847 days.

(21) Appl. No.: 12/551,129

(22) Filed: Aug. 31, 2009

(65) Prior Publication Data

US 2011/0049020 A1 Mar. 3, 2011

(51) Int. Cl.
*B07C 5/00* (2006.01)
*G06K 9/00* (2006.01)

(52) U.S. Cl.
USPC .............................. 209/534; 209/583; 209/584

(58) Field of Classification Search
USPC .............................. 209/534, 583, 584
See application file for complete search history.

(56) References Cited

U.S. PATENT DOCUMENTS 2,602,386 A * 7/1952 Brigham et al. .............. 396/368
2,841,275 A * 7/1958 Schwimmer et al. .......... 206/233
3,095,087 A * 6/1963 Yates .............................. 206/449
3,331,498 A * 7/1967 Davies ............................ 206/494
4,726,474 A * 2/1988 Arikawa et al. ................ 209/534
4,879,442 A * 11/1989 Giovine ........................... 206/233
5,000,322 A * 3/1991 Goi .................................. 209/534
5,129,545 A * 7/1992 Parks ................................ 221/34
5,697,517 A * 12/1997 Holland-Letz ..................... 221/9
5,836,436 A * 11/1998 Fortenbery et al. ....... 198/370.03
5,984,177 A * 11/1999 Do et al. ......................... 235/379
5,987,431 A * 11/1999 Johnston et al. ................. 705/35
6,103,963 A * 8/2000 Nakamura et al. ............... 84/486
6,299,158 B1 * 10/2001 Loeser et al. ................. 271/162
6,474,548 B1 * 11/2002 Montross et al. ............. 235/379
6,761,308 B1 * 7/2004 Hanna et al. .................. 235/379
6,926,168 B2 * 8/2005 Duesterhus et al. .......... 221/259
7,296,735 B2 * 11/2007 Tennant ........................ 235/379
7,607,573 B1 * 10/2009 Gromley et al. .............. 235/379
7,975,911 B2 * 7/2011 Artino et al. .................. 235/379
8,256,624 B2 * 9/2012 Doi et al. ...................... 209/534
8,292,087 B2 * 10/2012 Nagura .......................... 209/534
8,307,989 B2 * 11/2012 Takai et al. ................... 209/534

(Continued)

FOREIGN PATENT DOCUMENTS

EP 1199682 A2 * 4/2002
EP 1642462 A * 4/2002

(Continued)

OTHER PUBLICATIONS

European Search Report for European Patent Application No. 10172271.8, mailed Oct. 7, 2011.

*Primary Examiner* — Stefanos Karmis
*Assistant Examiner* — Michael E Butler
(74) *Attorney, Agent, or Firm* — Michael Chan

(57) ABSTRACT

A media depository comprises: an input for receiving deposited media items, a discriminator arranged to receive individual deposited media items from the input, and to ascertain whether each individual deposited media item is a banknote or a check; and a combined media container. The combined media container comprises: first and second media entrances, located opposite each other; first and second moveable supports, also located opposite each other; and an urging mechanism coupled to the first and second moveable supports and arranged to urge the first moveable support towards the first media entrance and the second moveable support towards the second media entrance, so that the first and second moveable supports are initially located at the first and second entrances respectively, and move closer to each other as media items are deposited.

14 Claims, 3 Drawing Sheets

(56) References Cited

U.S. PATENT DOCUMENTS

| | | | | |
|---|---|---|---|---|
| 8,335,367 | B2 * | 12/2012 | Nireki | 382/135 |
| 8,336,715 | B2 * | 12/2012 | Koga et al. | 209/534 |
| 8,356,747 | B2 * | 1/2013 | Sudo et al. | 235/379 |
| 2001/0056403 | A1 * | 12/2001 | Peebles et al. | 705/43 |
| 2002/0139842 | A1 * | 10/2002 | Swaine | 235/379 |
| 2003/0234257 | A1 * | 12/2003 | Tumlinson | 221/34 |
| 2004/0119225 | A1 * | 6/2004 | Yamamiya | 271/180 |
| 2004/0169074 | A1 * | 9/2004 | Washington et al. | 235/379 |
| 2004/0169846 | A1 * | 9/2004 | Ross | 356/71 |
| 2005/0006458 | A1 * | 1/2005 | Wanibe et al. | 235/379 |
| 2005/0010525 | A1 * | 1/2005 | Ross et al. | 705/43 |
| 2006/0144923 | A1 * | 7/2006 | VanKirk et al. | 235/379 |
| 2006/0202021 | A1 * | 9/2006 | VanKirk et al. | 235/379 |
| 2006/0273159 | A1 * | 12/2006 | Utz et al. | 235/381 |
| 2007/0138258 | A1 * | 6/2007 | Magee et al. | 235/379 |
| 2007/0162184 | A1 * | 7/2007 | Pinney et al. | 700/241 |
| 2008/0110976 | A1 * | 5/2008 | Utz et al. | 235/379 |
| 2008/0121693 | A1 * | 5/2008 | Beskitt | 235/379 |
| 2008/0126103 | A1 * | 5/2008 | Heo | 704/500 |
| 2008/0314972 | A1 * | 12/2008 | Crews et al. | 235/379 |
| 2009/0145960 | A1 * | 6/2009 | Ryan et al. | 235/379 |
| 2009/0229950 | A1 * | 9/2009 | Nakamoto | 194/302 |
| 2010/0126915 | A1 * | 5/2010 | Iwami | 209/534 |

FOREIGN PATENT DOCUMENTS

| | | | | |
|---|---|---|---|---|
| EP | 1489563 | A1 | | 12/2004 |
| EP | 1642463 | A | * | 4/2006 |
| GB | 2038290 | A | * | 7/1980 |
| GB | 2128594 | A | * | 5/1984 |
| GB | 2182717 | A | | 5/1987 |
| WO | 0235481 | A1 | | 5/2002 |

* cited by examiner

FIG. 4
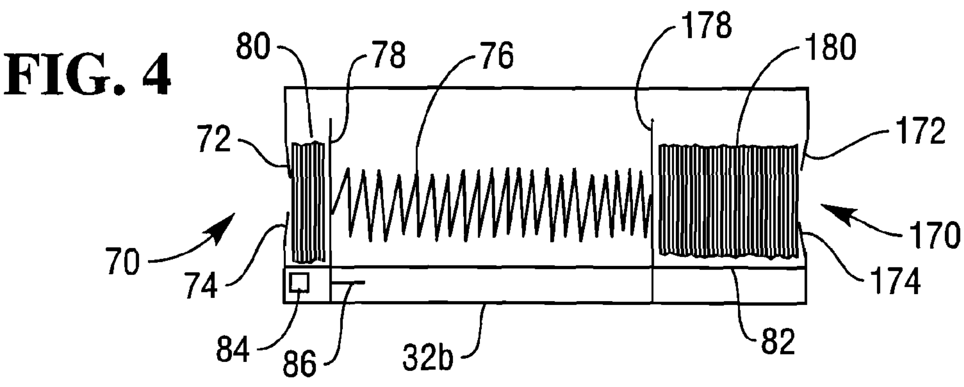
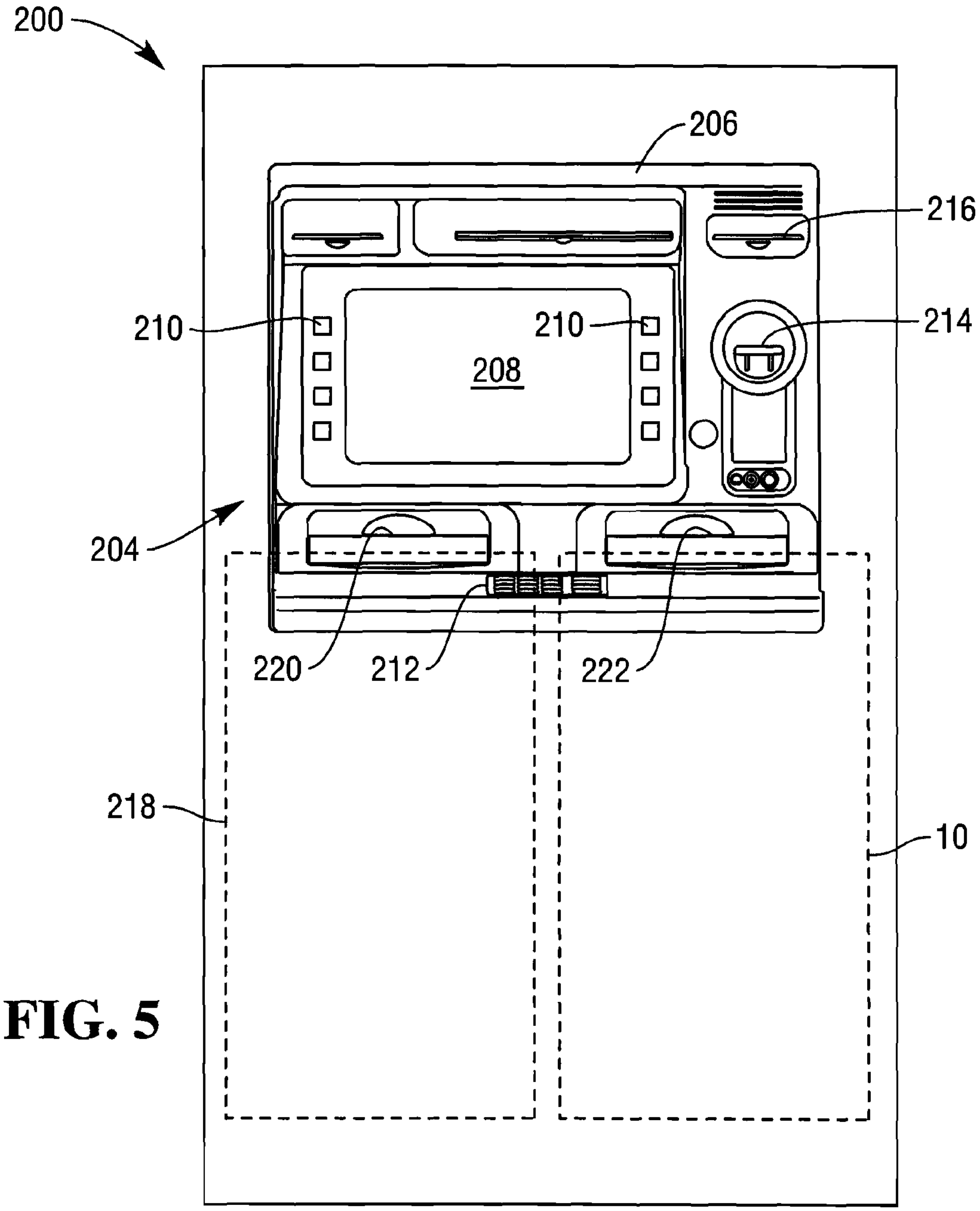
FIG. 5

MEDIA DEPOSITORY

FIELD OF INVENTION

The present invention relates to a media depository.

BACKGROUND OF INVENTION

Media depositories are typically used in self-service terminals (SSTs), such as automated teller machines (ATMs) to receive and store media items deposited by customers. These media items include checks, cash (banknotes and/or coins), and other items.

The media items may be deposited either individually, or as a bunch of either cash or checks, or as a mixed bunch of cash and checks.

ATM owners prefer to restrict the footprint of an ATM because an ATM is typically located in an area of high value per square meter, such as a retail outlet or a bank branch. This means that there is a practical limit to the number of deposit containers that can be provided in an ATM.

It is desirable to segregate deposited cash and checks by storing cash and checks in different containers. However, it is difficult to predict the relative quantities of cash and checks that will be deposited at any particular ATM. Each ATM only has a fixed, and relatively small, number of deposit containers. As a consequence, it is difficult to predict the number of deposit containers that should be allocated for checks and the number of deposit containers that should be allocated for cash.

Once one type of deposit container (for example, checks) is full, then the ATM can no longer accept deposits of that type of media until a service person has visited the ATM and emptied the full container or containers. However, there is also a requirement to ensure that ATMs do not have to be serviced, replenished, or emptied (of deposited media, such as cash or checks) too frequently.

It would therefore be advantageous to provide an ATM having dynamic storage of checks and cash during use of the ATM so that storage of checks and cash can be optimized.

SUMMARY OF INVENTION

Accordingly, the invention generally provides methods, systems, and apparatus for dynamic storage of different media types that require segregation.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a media depository comprising: an input for receiving deposited media items and for conveying the deposited media items, one at a time; a discriminator arranged to receive individual deposited media items from the input, and to ascertain whether each individual deposited media item is a first type of media item or a second type of media item; and a combined media container arranged to receive individual deposited media items from the discriminator, the combined media container comprising: a first media entrance arranged to receive a first type of media item; a second media entrance, located opposite the first media entrance, and arranged to receive a second type of media item, different from the first type; a first moveable support arranged to receive the first type of media items inserted through the first entrance; a second moveable support, located opposite the first moveable support, and arranged to receive the second type of media items inserted through the second entrance; an urging mechanism coupled to the first and second moveable supports and arranged to urge the first moveable support towards the first media entrance and the second moveable support towards the second media entrance, so that the first and second moveable supports are initially located at the first and second entrances respectively, and move closer to each other as media items are deposited.

The first type of media item may be checks.

The second type of media item may be banknotes.

The combined media container may be coupled to the discriminator by a first transport path arranged to transport checks to the first media entrance, and coupled to the discriminator by a second transport path arranged to transport banknotes to the second media entrance.

The moveable supports may comprise plates.

Each of the first and second media entrances may further comprise one or more flaps which deflect inwards to allow media items to be inserted therethrough, but prevent media items from exiting through the entrances. The flaps may be hingeably coupled to the media entrances.

The urging mechanism may comprise a resilient member coupled between the first and second moveable supports. The resilient member may comprise a coil spring, a gas spring, a leaf spring, or the like.

The urging mechanism may comprise a plurality of resilient members coupled between the first and second moveable supports.

The urging mechanism may comprise a ratchet mechanism.

A detector may be provided to detect when the first and second moveable supports come within a predetermined distance of each other.

The media depository may comprise a plurality of combined media containers, each combined media container storing two different types of media item. For example, eight different types of media item may be stored in four combined media containers.

According to a second aspect there is provided a self-service terminal including the media depository of the first aspect.

According to a third aspect there is provided a combined media container comprising: a storage chamber defining a first media entrance arranged to receive a first type of media item, and a second media entrance, located opposite the first media entrance, and arranged to receive a second type of media item, different from the first type of media item; a first moveable support located within the storage chamber and arranged to receive the first type of media items inserted through the first entrance; a second moveable support located within the storage chamber and opposite the first moveable support, and arranged to receive the second type of media items inserted through the second entrance; an urging mechanism coupled to the first and second moveable supports and arranged to urge the first moveable support towards the first media entrance and the second moveable support towards the second media entrance, so that the first and second moveable supports are initially located at the first and second entrances respectively, and move closer to each other as media items are deposited therein.

According to a fourth aspect there is provided a method of storing two different types of media item in a container, the method comprising: receiving a first type of media item; conveying the first type of media item to a first entrance at a first side of a container; urging a first moveable support within the container further away from the first entrance by loading the first type of media item into the first side of the container; receiving a second type of media item; conveying the second type of media item to a second entrance at a second side of a container, opposite the first side; urging a second moveable support within the container further away from the second entrance, and towards the first entrance, by loading the second type of media item into the second side of the container; and detecting when the first and second moveable supports come within a predetermined distance of each other.

The method may comprise the further step of alerting a depository incorporating the container in response to detecting when the first and second moveable supports come within a predetermined distance of each other.

By virtue of these aspects of the invention, a combined media container is provided that can be filled with checks (or another type of media item) from one side and with banknotes (or another type of media item) from the opposite side. The two different types of media items (for example, checks and banknotes) are segregated by moveable supports that are forced back as new media items are inserted. The combined media container is full when the two moveable supports come within a predetermined distance of each other (which may be physical contact, that is, zero distance).

These and other aspects will be apparent from the following specific description, given by way of example, with reference to the accompanying drawings.

BRIEF DESCRIPTION OF THE DRAWINGS

FIG. 4 is a schematic diagram illustrating the combined media container of FIGS. 2A to 2C in more detail; and FIG. 5 is a pictorial diagram illustrating a self-service terminal incorporating the media depository of FIG. 1.

DETAILED DESCRIPTION

Figure 1:
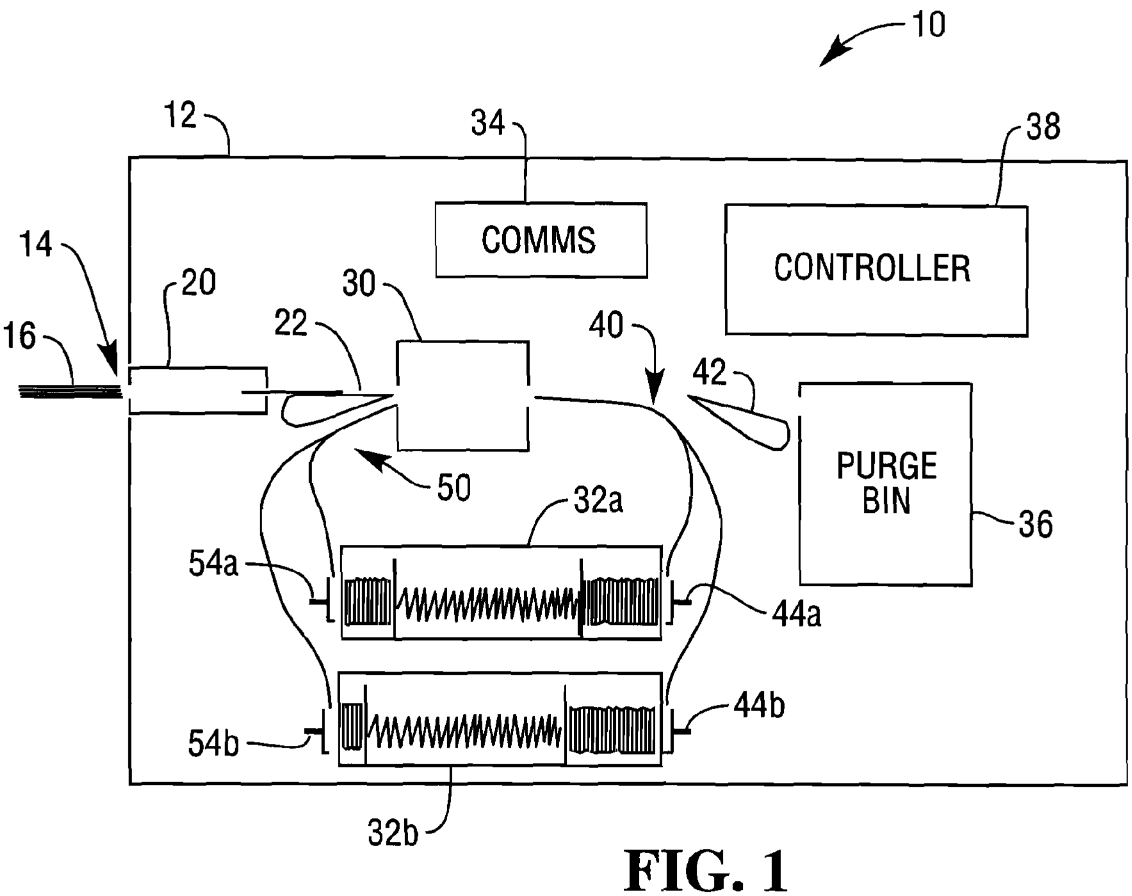
FIG. 1 is a schematic diagram of a media depository according to one embodiment of the present invention.

Reference is first made to FIG. 1, which is a schematic diagram of a media depository 10 (in the form of a combined banknote and check depository) according to one embodiment of the present invention. The combined depository 10 receives and stores both banknotes and checks in one or more combined (mixed) media containers.

The combined depository 10 includes a housing 12 defining an input aperture 14 for receiving a bunch 16 of media items. The combined depository 10 further comprises: a media item separator 20; a pivoting input transport 22; a discriminator 30; first and second combined media containers 32*a*,32*b*; a communications facility 34 for communicating with a terminal controller (not shown); a purge bin 36 for receiving media items that are unsuitable for deposit and not removed by the depositing customer; and a controller 38 for controlling the operation of the depository 10.

The media item separator 20 is operable to separate a received bunch 16 of media items, and convey each separated media item onto the pivoting input transport 22 (when the pivoting input transport 22 is in the closed position).

The pivoting input transport 22 conveys individual media items to the discriminator 30, which ascertains if a particular media item is a banknote, a check, or another type of document. The discriminator 30 includes a pair of imagers (not shown) for imaging both sides of a media item, and includes an algorithm (not shown) for validating banknotes, and for extracting data from checks. Suitable discriminators are well known to those of skill in the art and are commercially available from a number of different vendors, so will not be described herein. The discriminator 30 conveys validation information (for example, banknote denomination, check amount, and the like) to the controller 38.

There are two media transport paths out of the discriminator 30.

A first path 40 links the discriminator 30 to either the purge bin 36 (when a diverter gate/escrow 42 is closed) or a first entrance loader 44*a,b* of one of the combined media containers 32*a*,32*b* (when the diverter gate/escrow 42 is open). In this embodiment, this first transport path 40 is used to transport banknotes.

The second path 50 links the discriminator 30 to a second entrance loader 54*a,b* (opposite the first entrance loader 44*a,b*) of the combined media containers 32*a*,32*b* when the pivoting input transport 22 is in the open position. In this embodiment, this second transport path 50 is used to transport checks.

Figure 2C:
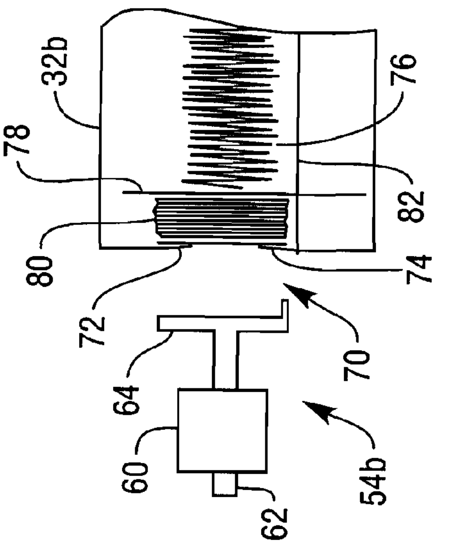
FIGS. 2A to 2C are schematic front views of parts (an entrance loader and its associated combined media container) of the media depository of FIG. 1.
Figure 2B:
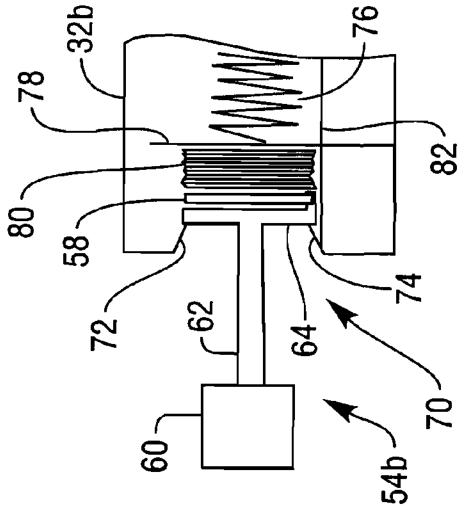
Figure 2A:
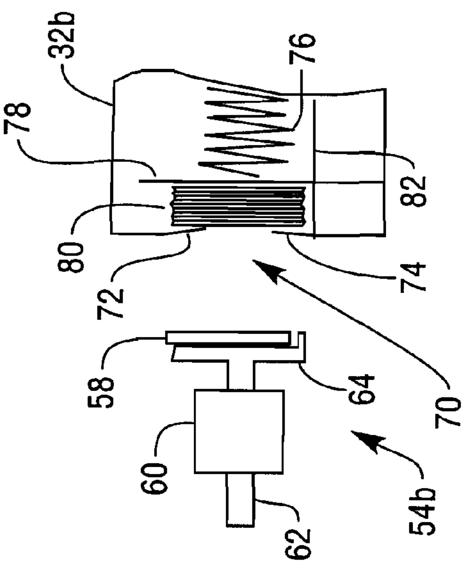

Reference will now also be made to FIGS. 2A to 2C, which are schematic front views of the second entrance loader 54*b* and the second container 32*b*. The first and second entrance loaders 44*a,b* and 54*a,b* are identical, so only one will be described in detail herein.

FIG. 2A illustrates the second entrance loader 54*b* in an inactive position but loaded with a check 58. FIG. 2B illustrates the loader in an activated position, depositing the loaded check 58 into the second container 32*b*. FIG. 2C illustrates the second entrance loader 54*b* returned to the inactive position after depositing the loaded check 58 into the second container 32*b*.

The second entrance loader 54*b* comprises a motor 60 controlling a plunger 62 coupled to a media support 64. As shown in FIG. 2A, when the plunger 62 is in the inactive position, the media support 64 can receive a check 58 conveyed via the second transport path 50.

When the motor is activated, the plunger 62 advances towards the second container 32*b*, as shown in FIG. 2B. The second entrance 70 includes hinged flaps 72,74 that can be deflected inwards by the combination of the advancing media support 64 and the check 58.

The second container 32*b* includes a resilient member 76 (in the form of a pair of coil springs) urging a moveable support 78 (in the form of a plate) against a horizontal stack of checks 80 stored within the second container 32*b*, so that the stack of checks 80 are in turn urged towards the second entrance 70. This causes the hinged flaps 72,74 to be deflected back to their rest position, as illustrated in FIG. 2C. Once the check 58 has been deposited into the second container 32*b* by the second entrance loader 54*b*, the check 58 becomes part of the stack 80 of checks. A base 82 is provided within the container 32 for supporting the horizontal stack of checks 80.

Figure 3:
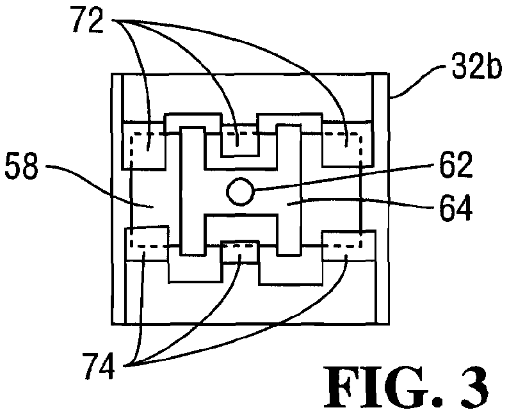
FIG. 3 is a schematic side view of the entrance loader of FIG. 2 aligned with its associated combined media container of the media depository of FIG. 1.

As best seen in FIG. 3, the deflecting flaps 72,74 have a complementary profile to that of the media support 64 to allow the media support to pass through the deflecting flaps 72,74 when no check 58 is carried by the media support 64.

Reference will now be made to FIG. 4, which is a schematic diagram illustrating a side view of the second container 32*b*. The second container 32*b* has a first entrance 170 (opposite, and corresponding to, second entrance 70), deflecting flaps 172,174 (opposite, and corresponding to, deflecting flaps 72,74), a banknote urging plate 178 (opposite, and corresponding to, check urging plate 78) for urging a horizontal stack of banknotes 180 stored within the second container 32*b* against the first entrance 170.

The second container 32*b* includes a circuit 84 that couples to the depository controller 38 when the second container 32*b* is installed in the depository housing 12. The circuit 84 communicates with a contact sensor 86 coupled to the check urging plate 78 and oriented towards the banknote urging plate 178. The circuit 84 changes state when the contact sensor 86 touches the banknote urging plate 178, thereby indicating to the depository controller 38 that the check urging plate 78 and the banknote urging plate 178 are within a predetermined distance of each other.

In this embodiment, the first and second containers 32*a,b* are inserted long side first (in contrast to conventional currency cassettes that are typically inserted short side first), but media items are loaded into the short sides of the first and second containers 32*a,b* (in contrast to currency hoppers that typically load media through an open top of the hopper).

In this embodiment, the first and second containers 32*a,b* include a removable lid (not shown) for allowing access to replenishers to the interior of the containers 32*a,b*.

Reference will now be made to FIG. 5, which is a schematic diagram illustrating a self-service terminal 200 (in the form of an ATM) incorporating the combined banknote and check depository 10.

The ATM 200 comprises a user interface 204 for receiving input (information and media) from, and providing output (information and media) to, a customer.

The user interface 204 comprises: a molded fascia 206 defining slots for accessing devices located within the ATM 200 and in registration with the slots; a display 208 aligned with opposing columns of function defined keys (FDKs) 210; an encrypting keypad 212; a token reader, in the form of a motorized card reader/writer (MCRW) device, located behind a card reader slot 214; a receipt printer located behind a receipt printer slot 216; a media dispenser 218, in the form of a cash dispenser, located behind a cash exit slot 220; and the combined banknote and check depository 10 located behind a depository slot 222.

In use, a customer inserts a card into the card reader slot 214, selects a deposit transaction using either the keypad 212 or an FDK 210, and then inserts a bunch of media items for deposit into depository slot 222.

The depository 10 processes a deposited bunch of media items in a conventional manner, so this process will only be described very briefly herein.

The media item separator 20 in the combined banknote and check depository 10 strips off individual media items from the deposited bunch, and conveys these one at a time, past the pivoting input transport 22 (which is in the closed position), to the discriminator 30.

The discriminator 30 ascertains what the media item is, and whether it is genuine (if it is a banknote). If the media item cannot be ascertained, then it is sent to the diverter gate/escrow 42 for temporary storage while the rest of the media items in the deposited bunch are validated.

When checks have been processed, the pivoting input transport 22 is moved to the open position, and the processed checks are sent via the second transport path 50 to the second entrance loader 54 of either the first or second container 32*a,b*, depending on which container 32 is to be filled first.

When banknotes have been processed, the diverter gate/escrow 42 is moved to (or maintained in) the open position to allow banknotes to be conveyed via the first transport path 40 to the first entrance loader 44 of either the first or second container 32*a,b*, depending on the denomination of banknote being conveyed. Typically, one container 32*a* will be used for one denomination, and another container 32*b* will be used for another denomination.

Any media items that were not identified are reversed out of the diverter gate/escrow 42, through the discriminator 30 and returned to the customer via the depository slot 222 of the ATM 200. If not removed by the customer within a preset time period, the unidentified media items can be transported back to the purge bin 36.

As each container 32 fills up from each side, the urging plates 78,178 will gradually move closer together, compressing the coil springs 76, until the contact sensor 86 touches the banknote urging plate 178, triggering a state change in the circuit 84. This state change is communicated to the depository controller 38, which conveys a "container full" status message to an ATM controller (not shown) in the ATM 200.

When one container (for example, 32*a*) is full, the depository 10 then conveys all further deposits to the remaining containers (for example, 32*b*) that are not yet full. Once all containers 32*a,b* are full, then the ATM 200 ceases to offer a deposit function to customers until the containers 32*a,b* have been emptied or replaced with empty containers 32.

It will now be appreciated that this embodiment has the advantage that the amount of storage space assigned to checks and banknotes is automatic and dynamic.

Various modifications may be made to the above described embodiment within the scope of the invention, for example, in other embodiments, a different detector to the circuit 84 and contact sensor 86 may be provided. For example, a potentiometer arrangement may be implemented by the urging plates sliding along a resistor, so that as the urging plates move closer to each other, the effective resistance of the resistor is lowered. Alternative electrical or mechanical detectors may be used, such as proximity detectors, strain gauges, and the like.

In other embodiments, the contact sensor 86 may be provided on arm extending from the plate 78 (or the plate 178); the length of the arm corresponding to the desired proximity of the two plates 78,178 that will trigger a container full condition.

In other embodiments a plurality of contact sensors 86 may be provided on arms of different lengths, so that an early warning is provided that a container is nearing full storage capacity.

In other embodiments, the resilient member 76 may take a different form (such as a different number of coil springs, one or more leaf springs, a gas spring, a ratchet, or the like), or be located in a different part of the container, such as below the base 82.

In other embodiments, a different number of containers may be provided for receiving deposited media; for example, a greater or fewer number than two containers may be provided. Some containers may be provided to store counterfeit media in one part and suspect counterfeit media in the other part of the container. Some containers may store two denominations, one denomination in each of the two parts, so that the two denominations are segregated within one container.

In other embodiments, additional purge bins may be provided, for example, one for suspected counterfeit notes, and one for counterfeit notes.

In other embodiments, different media items may be deposited than checks or banknotes, for example, passes, tickets, licenses, or the like.

In other embodiments, a different type of entrance loader may be used to that described above, for example, the entrance loader may comprise a stacker wheel arrangement, or any other convenient media loading mechanism.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

What is claimed is:

1. A media depository comprising:
- an input for receiving deposited media items and for conveying the deposited media items, one at a time;
- a discriminator arranged to receive individual deposited media items from the input, and to ascertain whether each individual deposited media item is a first type of media item or a second type of media item; and
- a combined media container arranged to receive individual deposited media items from the discriminator,
- the combined media container comprising:
  - a first media entrance arranged to receive the first type of media item;
  - a second media entrance, located opposite the first media entrance, and arranged to receive the second type of media item, different from the first type;
  - a first moveable support arranged to receive the first type of media items inserted through the first entrance;
  - a second moveable support, located opposite the first moveable support, and arranged to receive the second type of media items inserted through the second entrance;
  - an urging mechanism coupled to the first and second moveable supports and arranged to urge the first moveable support towards the first media entrance and the second moveable support towards the second media entrance, so that the first and second moveable supports are initially located at the first and second entrances respectively, and move closer to each other as media items are deposited.

2. A media depository according to claim 1, wherein the first type of media item comprises checks.

3. A media depository according to claim 2, wherein the second type of media item comprises banknotes.

4. A media depository according to claim 3, wherein the combined media container is coupled to the discriminator by a first transport path arranged to transport checks to the first media entrance, and coupled to the discriminator by a second transport path arranged to transport banknotes to the second media entrance.

5. A media depository according to claim 1, wherein the moveable supports comprise plates.

6. A media depository according to claim 1, wherein each of the first and second media entrances further comprises one or more flaps which deflect inwards to allow media items to be inserted therethrough, but prevent media items from exiting therethrough.

7. A media depository according to claim 6, wherein the flaps are hingeably coupled to the media entrances.

8. A media depository according to claim 1, wherein the urging mechanism comprises a resilient member coupled between the first and second moveable supports.

9. A media depository according to claim 8, wherein the resilient member comprises a coil spring.

10. A media depository according to claim 1, further comprising a detector arranged to detect when the first and second moveable supports come within a predetermined distance of each other.

11. A media depository according to claim 10, wherein the detector comprises a contact sensor coupled to the first moveable support, and an associated circuit for changing state when the contact sensor touches the second moveable support.

12. A media depository comprising:
- an input for receiving deposited media items and for conveying the deposited media items, one at a time;
- a discriminator arranged to receive individual deposited media items from the input, and to ascertain whether each individual deposited media item is a first type of media item or a second type of media item;
- a combined media container arranged to receive individual deposited media items from the discriminator,
- the combined media container comprising:
  - a first media entrance arranged to receive the first type of media item;
  - a second media entrance, located opposite the first media entrance, and arranged to receive the second type of media item, different from the first type;
  - a first moveable support arranged to receive the first type of media items inserted through the first entrance;
  - a second moveable support, located opposite the first moveable support, and arranged to receive the second type of media items inserted through the second entrance;
  - an urging mechanism coupled to the first and second moveable supports and arranged to urge the first moveable support towards the first media entrance and the second moveable support towards the second media entrance, so that the first and second moveable supports are initially located at the first and second entrances respectively, and move closer to each other as media items are deposited;
- wherein (i) the moveable supports comprise plates, and (ii) the urging mechanism comprises a resilient member coupled between the first and second moveable supports; and
- a detector arranged to detect when the first and second moveable supports come within a predetermined distance of each other.

13. A media depository according to claim 12, wherein (i) the resilient member comprises a coil spring, and (ii) the detector comprises a contact sensor coupled to the first moveable support, and an associated circuit for changing state when the contact sensor touches the second moveable support.

14. A media depository according to claim 13, wherein (i) each of the first and second media entrances further comprises one or more flaps which deflect inwards to allow media items to be inserted therethrough, but prevent media items from exiting therethrough, and (ii) the flaps are hingeably coupled to the media entrances.

* * * * *